(12) United States Patent
Dine et al.

(10) Patent No.: US 12,039,674 B2
(45) Date of Patent: Jul. 16, 2024

(54) INERTIAL DATA MANAGEMENT FOR EXTENDED REALITY FOR MOVING PLATFORMS

(71) Applicant: Apple Inc., Cupertino, CA (US)

(72) Inventors: Abdelhamid Dine, Cupertino, CA (US); Kuen-Han Lin, Mountain View, CA (US); Stergios Roumeliotis, Cupertino, CA (US); Oleg Naroditsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/478,771

(22) Filed: Sep. 17, 2021

(65) Prior Publication Data

US 2022/0092859 A1    Mar. 24, 2022

Related U.S. Application Data

(60) Provisional application No. 63/080,623, filed on Sep. 18, 2020.

(51) Int. Cl.
*G06T 19/00* (2011.01)
*G06F 3/0346* (2013.01)
*G06F 3/04815* (2022.01)
*G06T 7/20* (2017.01)

(52) U.S. Cl.
CPC .......... *G06T 19/006* (2013.01); *G06F 3/0346* (2013.01); *G06F 3/04815* (2013.01); *G06T 7/20* (2013.01)

(58) Field of Classification Search
CPC ............ G06T 19/006; G06T 7/20; G06T 2207/10016; G06T 2207/30244; G06T 7/246; G06F 3/0346; G06F 3/04815; G06F 3/011; G06F 1/163; G06F 3/0487; G01C 21/165; G01C 21/18; G02B 27/0101; G02B 27/0172
See application file for complete search history.

(56) References Cited

U.S. PATENT DOCUMENTS 9,253,416 B2    2/2016  Dunn
9,766,075 B2    9/2017  Foxlin
10,111,620 B2  10/2018  Miller
(Continued)

FOREIGN PATENT DOCUMENTS

CN    107111340 A    8/2017
CN    108427479 A    8/2018
CN    110402368 A    11/2019

OTHER PUBLICATIONS

Chinese Office Action from Chinese Patent Application No. 202111097591.5, dated Mar. 26, 2024, 21 pages including English language translation.

*Primary Examiner* — Ryan R Yang
(74) *Attorney, Agent, or Firm* — BAKERHOSTETLER

(57) ABSTRACT

Implementations of the subject technology provide extended reality display devices that can be used on and/or off of a moving platform. Systems and methods are disclosed for separating out the motion of the moving platform from other motions of the device so that virtual content can be displayed without erroneous motions caused by the motion of the moving platform. The subject technology can provide extended reality settings on any suitable moveable platform such as in a car, a watercraft, an aircraft, a train, or any other vehicle.

17 Claims, 13 Drawing Sheets

(56) References Cited

U.S. PATENT DOCUMENTS

| | | | |
|---|---|---|---|
| 10,663,298 B2 | 5/2020 | Ali et al. | |
| 10,984,242 B1 | 4/2021 | Atlas | |
| 2002/0194914 A1 | 12/2002 | Foxlin | |
| 2011/0082585 A1 | 4/2011 | Sofman et al. | |
| 2017/0004630 A1 | 1/2017 | Al-Hamad | |
| 2017/0030716 A1* | 2/2017 | Ali | B60W 50/14 |
| 2018/0259350 A1* | 9/2018 | Al-Hamad | G01C 21/206 |
| 2018/0372499 A1 | 12/2018 | Ali et al. | |
| 2019/0041980 A1* | 2/2019 | Trythall | G09G 5/38 |
| 2019/0156584 A1 | 5/2019 | Herman et al. | |
| 2019/0383937 A1* | 12/2019 | Comer | G06T 19/006 |
| 2019/0384383 A1 | 12/2019 | Lee | |
| 2020/0111256 A1 | 4/2020 | Bleyer | |
| 2020/0151943 A1 | 5/2020 | Navarrette | |
| 2020/0265598 A1* | 8/2020 | Iyer | G06T 7/579 |
| 2020/0271450 A1* | 8/2020 | Gorur Sheshagiri | G06F 3/0346 |
| 2021/0042992 A1 | 2/2021 | Newman | |
| 2021/0056762 A1 | 2/2021 | Robbe | |
| 2021/0327146 A1 | 10/2021 | Buerli | |
| 2021/0366192 A1 | 11/2021 | Brimhall | |
| 2022/0070365 A1 | 3/2022 | Miller-Vedam | |

* cited by examiner

US 12,039,674 B2

INERTIAL DATA MANAGEMENT FOR EXTENDED REALITY FOR MOVING PLATFORMS

CROSS REFERENCE TO RELATED APPLICATIONS

This application claims the benefit of priority to U.S. Provisional Patent Application No. 63/080,623, entitled "Extended Reality For Moving Platforms," filed on Sep. 18, 2020, the disclosure of which is hereby incorporated herein in its entirety.

TECHNICAL FIELD

The present description relates generally to extended reality settings.

BACKGROUND

Electronic devices can display and modify content based on the orientation and/or motion of the device. However, it can be challenging to determine the orientation and/or motion of a device in some circumstances, particularly for portable electronic devices that are free to be moved within the physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1A:
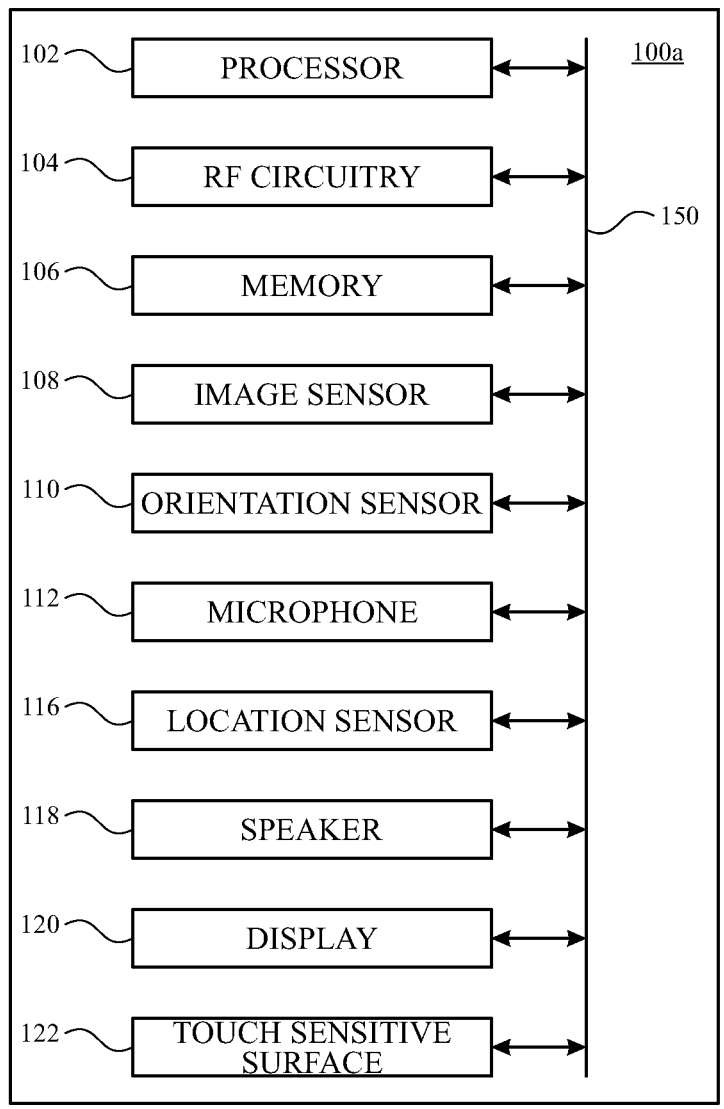
FIGS. 1A-1B depict exemplary systems for use in various extended reality technologies, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an XR system for displaying virtual content with an electronic device that is on or near a moveable platform in various motion states of the moveable platform, such as when the moveable platform is stationary or in motion with a constant or changing velocity. Because an electronic device that displays virtual content often tracks its own motion in the physical setting in order to render the virtual content at a fixed location in a virtual or mixed reality setting, motion of the electronic device that is due to motion of a moving platform can cause undesired errors in the display of the virtual content.

For example, a virtual object can be displayed to appear at a stationary location on the floor next to a user that is seated on a train that currently not moving, by an electronic device that is being carried or worn (e.g., on the head) of the user. As the user turns the device to look around the extended reality setting that includes the train and the virtual object, the motion of the electronic device relative to the stationary train is detected and used to modify the displayed location of the virtual object on the display of the electronic device, so that the virtual object appears to be stationary at the location on the floor. However, when the train begins to move, the electronic device also detects this train motion and may incorrectly interpret the train motion as motion of the device relative to the location at which the virtual object is displayed. In such a scenario, the electronic device may incorrectly move the location of the virtual object on the display of the electronic device to account for the motion of the train, resulting in the virtual object erroneously appearing to slide backwards down the aisle of the train.

In one or more implementations of the subject technology, systems, devices, and methods are provided that manage the use of inertial data from inertial sensors such as one or more sensors of an inertial measurement unit (IMU) so that the device can be controlled based on the orientation and/or motion of the device, whether the device is stationary relative to the ground, on a stationary moveable platform, on a moveable platform that is moving with a constant velocity relative to the ground, or on a platform having a changing velocity (e.g., accelerating or decelerating) relative to the ground.

For example, XR systems may be provided that can detect and account for the motion of a moving platform (e.g., a moveable platform that is currently in motion). For example, an electronic device may detect that it is on a moving platform, and control the display of virtual content in accordance with (i) the motion of the moving platform and/or (ii) the device motion on the moving platform. As an example, the electronic device can control the display of virtual content by using optical tracking data (e.g., and reducing, and/or otherwise managing the use of other sensor data such as some or all of the inertial data) when the moving platform is accelerating or decelerating.

For example, an electronic device may manage the use of inertial data (motion data) from one or more inertial sensors (in some operational scenarios in which the electronic device is on a moving platform) by continuing to use the inertial data, but with reduced weights (e.g., treating the inertial data as higher uncertainty data as compared to the treatment of the inertial data when the electronic device is not on a moving platform). In this way, inertial data such as IMU measurements can be used differently depending on the motion state of a moveable platform on which the device is disposed. In one or more implementations, the weights can also be varied based on a scene profile of the physical environment in which the electronic device is disposed. In various operational scenarios, weights that are applied to the inertial data in an optimization a cost function can be varied, depending on the platform motion, from a set of original weights that are applied when the electronic device is stationary or on non-moving platform or a moveable platform in a constant velocity motion state. For example, the weights can be reduced, based on the platform motion, to zero (e.g., during times of high disturbance motion of the moving platform) or to any weight value between the original value and zero, for "milder" motion conditions of the moving platform.

In one or more implementations, the electronic device may detect motion (e.g., changing velocity motion, such as accelerated motion or decelerated motion) of the moving platform using a first SLAM system that uses visual data from an image sensor and inertial data from an inertial sensor (e.g., by detecting a discrepancy between the visual data and the inertial data of the first SLAM system), and control the display of the virtual content, during the detected changing velocity motion using a second SLAM system (e.g., a visual-only SLAM system that does not incorporate inertial data from the inertial sensors). During the changing velocity motion and while controlling the display of virtual content using the visual-only SLAM system, the electronic device may continue to use at least some of the inertial data (e.g., along with the visual-only SLAM system) to monitor whether the motion of the moveable platform has changed from a changing velocity motion state to a constant velocity motion state (e.g., by comparing some or all of the inertial data with motion information based on visual data), and may return to using the first SLAM system when a constant velocity platform motion or ceasing of the platform motion is detected based on the monitoring. In one or more implementations, in order to avoid high frequency switching between the first SLAM system and the second SLAM system, the electronic device may modify the operation of the first SLAM system (e.g., by de-weighting inertial data used by the first SLAM system) for a period of time (e.g., between one and three seconds) to confirm the detected changing velocity motion before switching to the second SLAM system, and/or may concurrently operate the first SLAM system and the second SLAM system for a period of time (e.g., between one and three seconds) prior to switching back from the second SLAM system to the first SLAM system. In this way, the electronic device can process inertial data in various ways for operation of the electronic device in various motion states of a moveable platform on which the electronic device is disposed.

Figure 1B:
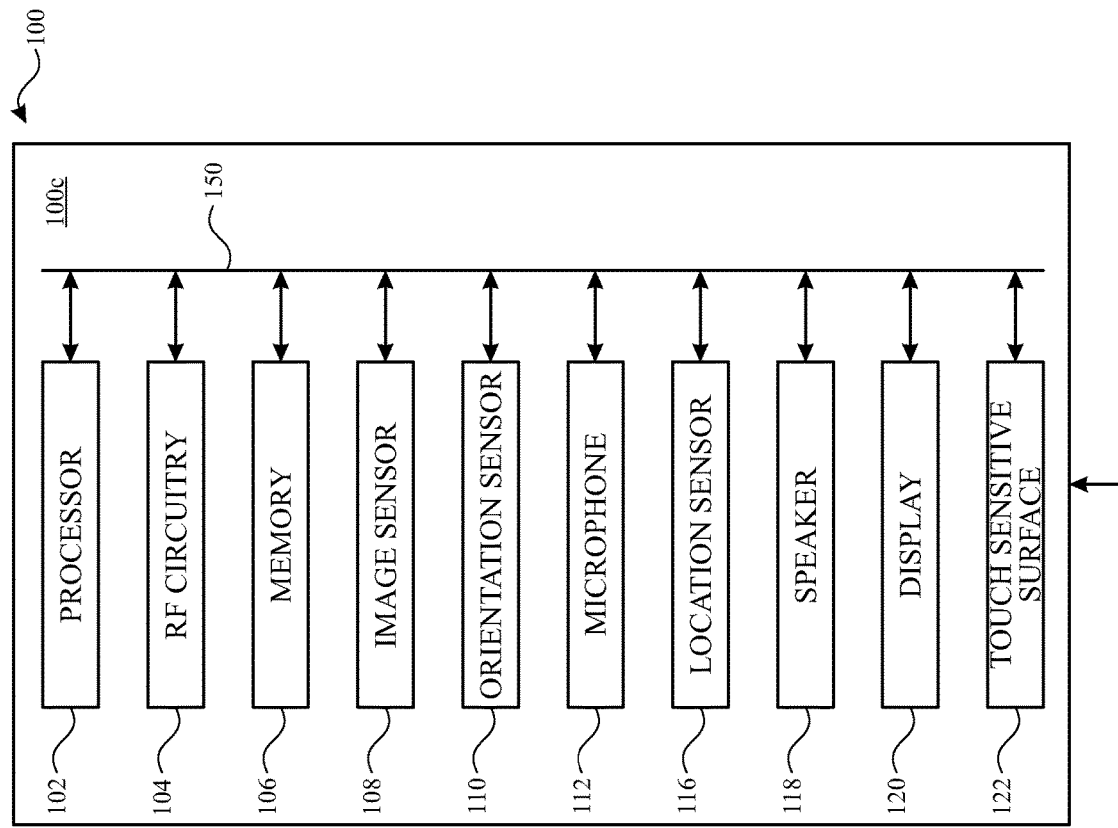
Figure 1B:
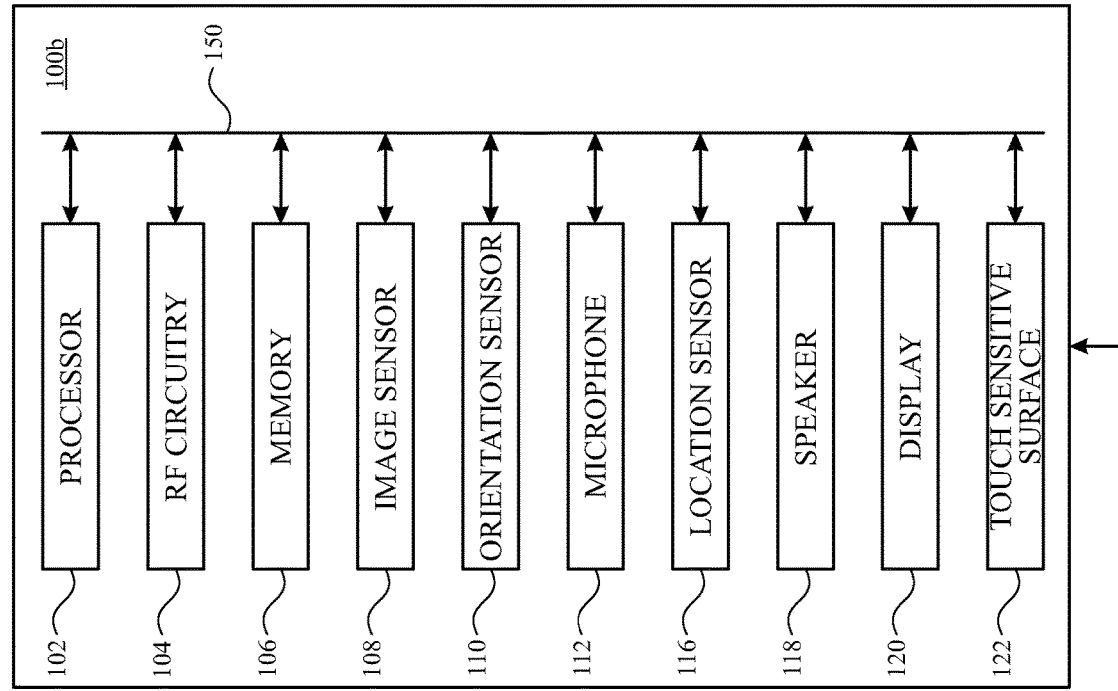

FIG. 1A and FIG. 1B depict exemplary system 100 for use in various extended reality and/or other technologies.

In some examples, as illustrated in FIG. 1A, system 100 includes electronic device 100a. Electronic device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of electronic device 100a.

In some examples, elements of system 100 are implemented in a base station device (e.g., a computing device, such as a remote server, mobile device, or laptop) and other elements of system 100 are implemented in a second device (e.g., a head-mounted device). In some examples, electronic device 100a is implemented in a base station device or a second device.

As illustrated in FIG. 1B, in some examples, system 100 includes two (or more) devices in communication, such as through a wired connection or a wireless connection. Electronic device 100b (e.g., a base station device) includes processor(s) 102, RF circuitry(ies) 104, and memory(ies) 106. These components optionally communicate over communication bus(es) 150 of electronic device 100b. Electronic device 100c (e.g., a smartphone, a tablet, or a wearable device such as a smart watch or a head-mountable device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of electronic device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2:
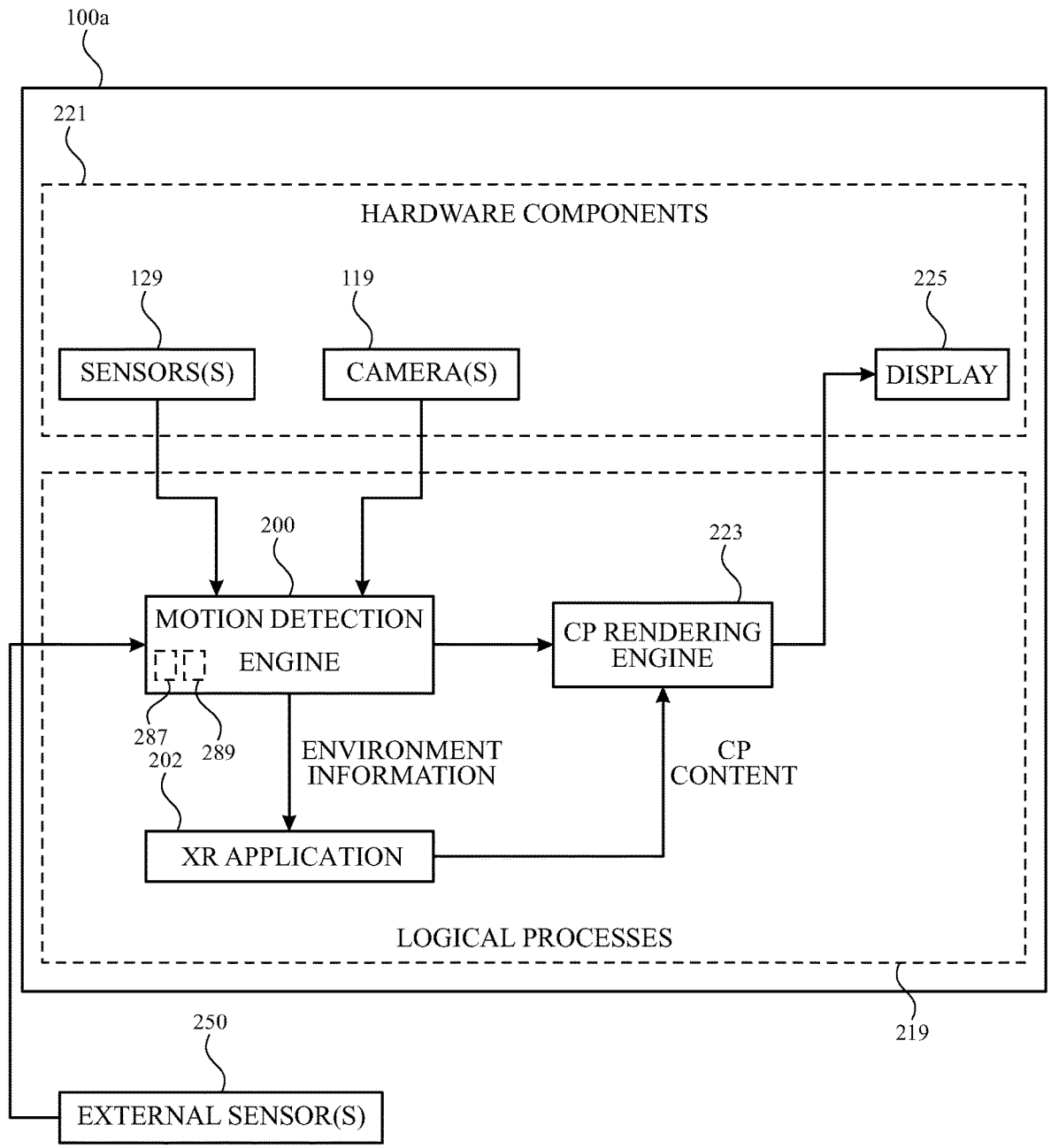
FIG. 2 illustrates an example architecture that may implement the subject technology in accordance with one or more implementations of the subject technology.

FIG. 2 illustrates an example architecture, including hardware components 221 and logical processes 219, that may be implemented on an electronic device such as the electronic device 100a, the electronic device 100b, and/or the electronic device 100c in accordance with one or more implementations of the subject technology. For explanatory purposes, portions of the logical processes 219 of the architecture of FIG. 2 are described as being implemented by the electronic device 100a of FIG. 1A, such as by a processor and/or memory of electronic device; however, appropriate portions of the architecture may be implemented by any other electronic device, including the electronic device 100b and/or the electronic device 100c. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of logical processes 219 of the architecture of FIG. 2 can be implemented in software or hardware, including by one or more processors and a memory device containing instructions, which when executed by the processor cause the processor to perform the operations described herein. In the example of FIG. 2, electronic device 100a includes sensors 129 (e.g., including implementations of one or more of image sensor 108, orientation sensor 110, and/or location sensor 116 of FIGS. 1A and 1B, and/or other sensors such an inertial measurement unit (IMU) including one or more accelerometers and/or gyroscopes and/or compasses, and/or other magnetic and motion sensors) that provide sensor data (e.g., depth sensor data from one or more depth sensors, location data such as global positioning system (GPS) data, Wi-Fi location data, and/or near field communications location data, and/or device motion data from one or more motion sensors such as an accelerometer, a gyroscope, a compass, an inertial measurement unit (IMU) including one or more accelerometers and/or gyroscopes and/or compasses, and/or other magnetic and motion sensors), for example, to a motion detection engine 200. Camera(s) 119 (e.g., implementing one or more image sensors 108) may also provide images, such as one or more video streams, to motion detection engine 200. In one or more implementations, camera(s) 119 may also include one or more event-based sensors which report changes in the pixel values instead of the pixel values themselves, and which may extend the camera sensitivity to a wider range of lighting conditions and offer higher frame rates than cameras that output pixel values.

Motion detection engine 200 may including one or more simultaneous localization and mapping (SLAM) systems that generate mapping, location, and/or pose information, which may include three-dimensional scene information, such as a three-dimensional map of some or all of the physical environment of electronic device 100a and/or a device position, rotation, and/or motion (e.g., velocity and/or acceleration) within the physical environment, using the sensor data (e.g., the depth information, location data, motion data, magnetic data, and/or images) from sensors 129 and camera(s) 119. For example, the motion detection engine 200 may include a visual-inertial (VI) SLAM system 287 (also referred to herein as a first SLAM system in some examples) and a visual-only (VO) SLAM system 289 (also referred to herein as a second SLAM system in some examples). Motion detection engine 200 may detect motion of the electronic device 100a (e.g., in one, two, three, four, five, or six dimensions). For example, motion detection engine 200 may detect up to three degrees of translational motion and/or up to three degrees of rotational motion of electronic device 100a (e.g., relative to a fixed reference frame such as a reference frame that is fixed to the surface of the Earth at or near the location of the electronic device such as the (x, y, z) reference frame in FIG. 3, and/or relative to a moving reference frame such as a reference frame that is fixed to a moveable platform such as the (x', y', z') reference frame of FIG. 3).

Although motion detection engine 200 is depicted in FIG. 2 as a single element, motion detection engine 200 may be implemented as multiple separate processes that are performed in series and/or in parallel for detection of device motion and/or motion of a moveable platform. Some or all of the operations described in connection with motion detection engine 200 may be performed by an XR application 202 and/or by a rendering engine for computer-produced (CP) content such as CP rendering engine 223. Motion detection engine 200 may include one or more SLAM systems (e.g., VI SLAM system 287 and VO SLAM system 289) for tracking the motion of electronic device 100a relative to a reference frame (e.g., relative to one of a reference frame corresponding to a moveable platform, such as the (x', y', z') reference frame illustrated in FIG. 3 or a fixed reference frame such as the (x, y, z) reference frame illustrated in FIG. 3). In the example of FIG. 2, the motion detection engine 200 includes the VI SLAM system 287 that receives visual (e.g., image) data from camera(s) 119 and inertial data (e.g., gyroscope data, accelerometer data, and/or magnetometer data) from sensor(s) 129) and the VO SLAM system 289 that receives visual data from camera(s) 119 and generates an output that is independent of inertial data. As described herein, the VI SLAM system 287 and the VO SLAM system 289 can be operated together and/or separately to manage the use of inertial data for tracking the motion of the electronic device 100a relative to a movable platform in various motion states of the movable platform and/or various motion states of the electronic device 100a itself (e.g., as discussed in further detail hereinafter in connection with FIGS. 6-12).

As illustrated in FIG. 2, in one or more implementations, motion detection engine 200 may receive sensor data from one or more external sensors 250. For example, external sensors 250 may be motion and/or location sensors that are implemented as part of a moveable platform, such as motion and/or location sensors that are implemented as part of a car, a plane, a train, a ship, or other moveable platform. Motion detection engine 200 may receive sensor data from external sensors 250 and/or motion and/or location information for a moveable platform, as determined by processing circuitry at the moveable platform.

As illustrated in FIG. 2, an XR application 202 may receive environment information (e.g., including location information, motion information, scene information, etc.) from motion detection engine 200. XR application 202 may be a gaming application, a media player application, a content-editor application, a training application, a simulator application, or generally any application that displays computer-produced (CP) or virtual content in a virtual setting and/or at locations that depend on the physical setting, such as by anchoring the virtual content to an anchoring location that is fixed relative to a fixed or moving reference frame in the physical setting. In one or more implementations, one or more of the XR application 202, the motion detection engine 200, and/or the CP rendering engine, may be a part of an operating system level process and/or framework that provides for virtual content anchoring functionality.

Motion detection engine 200, XR application 202, and/or CP rendering engine 223 may determine an anchoring location for virtual content to be generated by the XR application 202 based on the detected motion of the electronic device. For example, electronic device 100a (e.g., motion detection engine 200) may identify device motion of the electronic device 100a using one or more of sensors 129 (e.g., and/or camera 119), and may determine that the device motion includes a first component associated with a motion of a moving platform and a second component that is separate from the motion of the moving platform.

The first component and the second component of the motion of the device can be detected and/or separated from each other using one or more combinations of cameras and/or sensors on the electronic device itself and/or on the moving platform.

The electronic device 100a may determine an anchoring location that is fixed relative to the moveable platform in any of various motion states of the moveable platform. The determined anchoring location can be determined and/or used by XR application 202 and/or CP rendering engine 223 for display of virtual content anchored to the anchoring location that is fixed relative to a moveable platform, using at least the second component of the device motion that is separate from the motion of the moving platform. For example, the second component of the device motion (e.g., the motion of the device relative to the moving platform) can be used the track the location of the electronic device 100a relative to the determined anchoring location. The virtual content (e.g., one or more virtual objects or an entire virtual setting) can be displayed anchored to the anchoring location that is fixed relative to the moving platform by rendering the virtual content anchored to the anchoring location using CP rendering engine 223 and displaying the rendered virtual content using display 225 (e.g., an implementation of display 120 of FIGS. 1A and 1B).

In any of various implementations, motion detection engine 200, XR application 202, and/or CP rendering engine 223 can generate anchoring locations that are fixed relative to a moveable platform For example, once CP content (e.g., a virtual cup, virtual document, virtual television screen, virtual movie theater screen, virtual keyboard, virtual setting, etc.) has been generated by XR application 202, the CP content can be provided to a CP rendering engine 223, as illustrated in FIG. 2. Environment information such as a depth map of the physical setting, can also be provided to CP rendering engine 223. CP rendering engine 223 can then render the CP content from XR application 202 for display by display 225 of electronic device 100a. The CP content is rendered for display at the appropriate location on the display 225 to appear in association with the anchoring location (e.g., provided by motion detection engine 200). Display 225 may be, for example, an opaque display, and camera 119 may be configured to provide a video pass-through feed to the opaque display. The CP content may be rendered for display at a location on the display corresponding to the displayed location of the anchoring location in the video pass-through. Display 225 may be, as another example, a transparent or translucent display. The CP content may be rendered for display at a location on the display corresponding to a direct view, through the transparent or translucent display, of the anchoring location. Although the example of FIG. 2 illustrates a CP rendering engine 223 that is separate from XR application 202, it should be appreciated that, in some implementations, XR application 202 may render CP content for display by display 225 without using a separate CP rendering engine 223.

Figure 3:
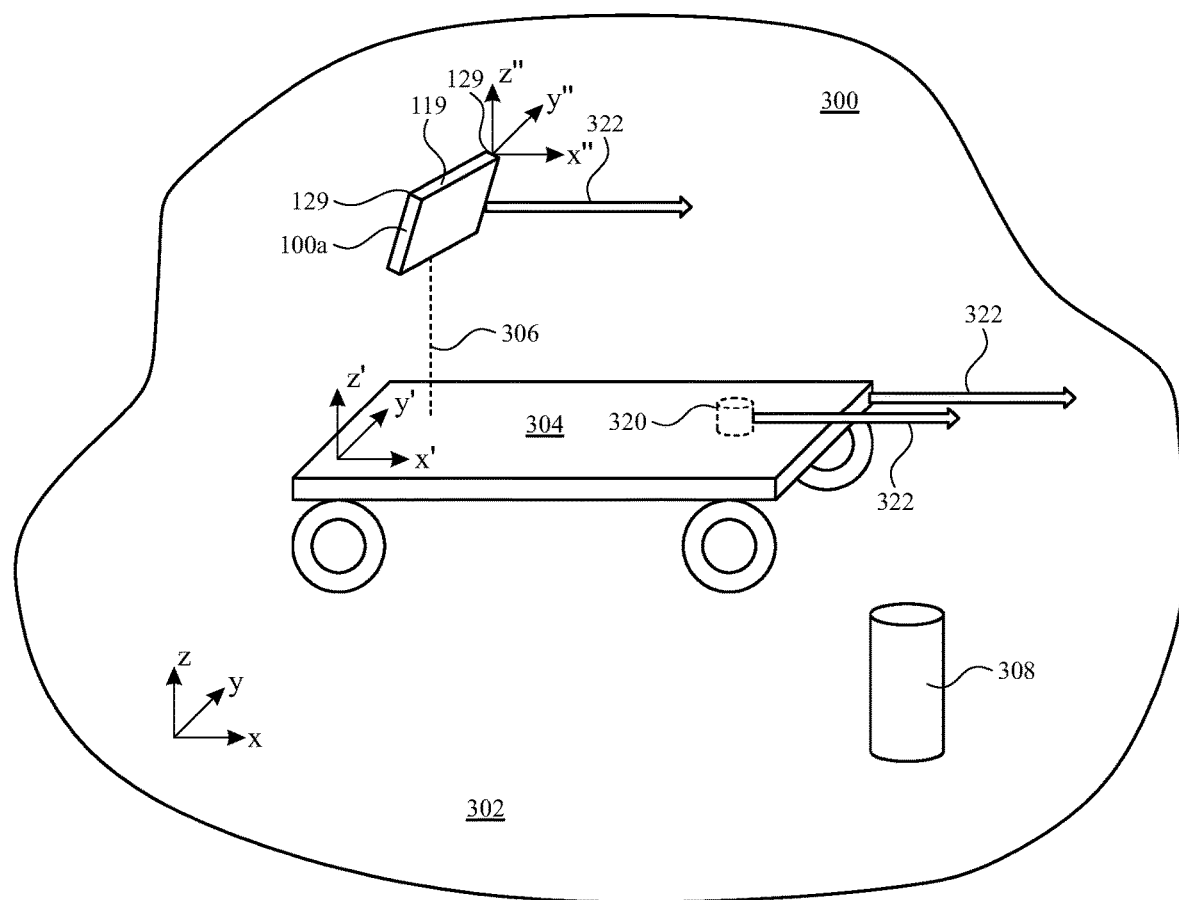
FIG. 3 illustrates an example of a physical setting of an electronic device, the physical setting including a moving platform in accordance with implementations of the subject technology.
Figure 4:
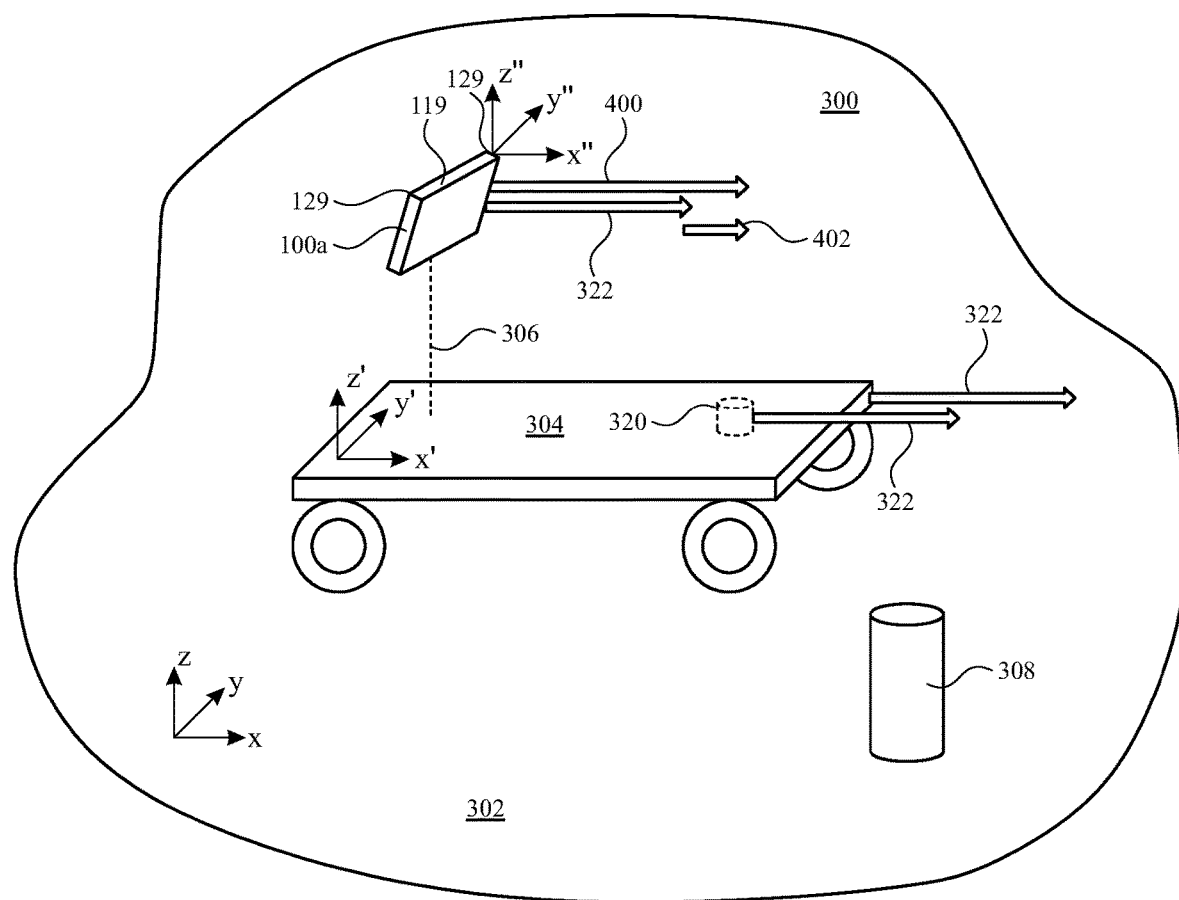
FIG. 4 illustrates an example in which an electronic device is moving with and relative to a moving platform in accordance with implementations of the subject technology.
Figure 5:
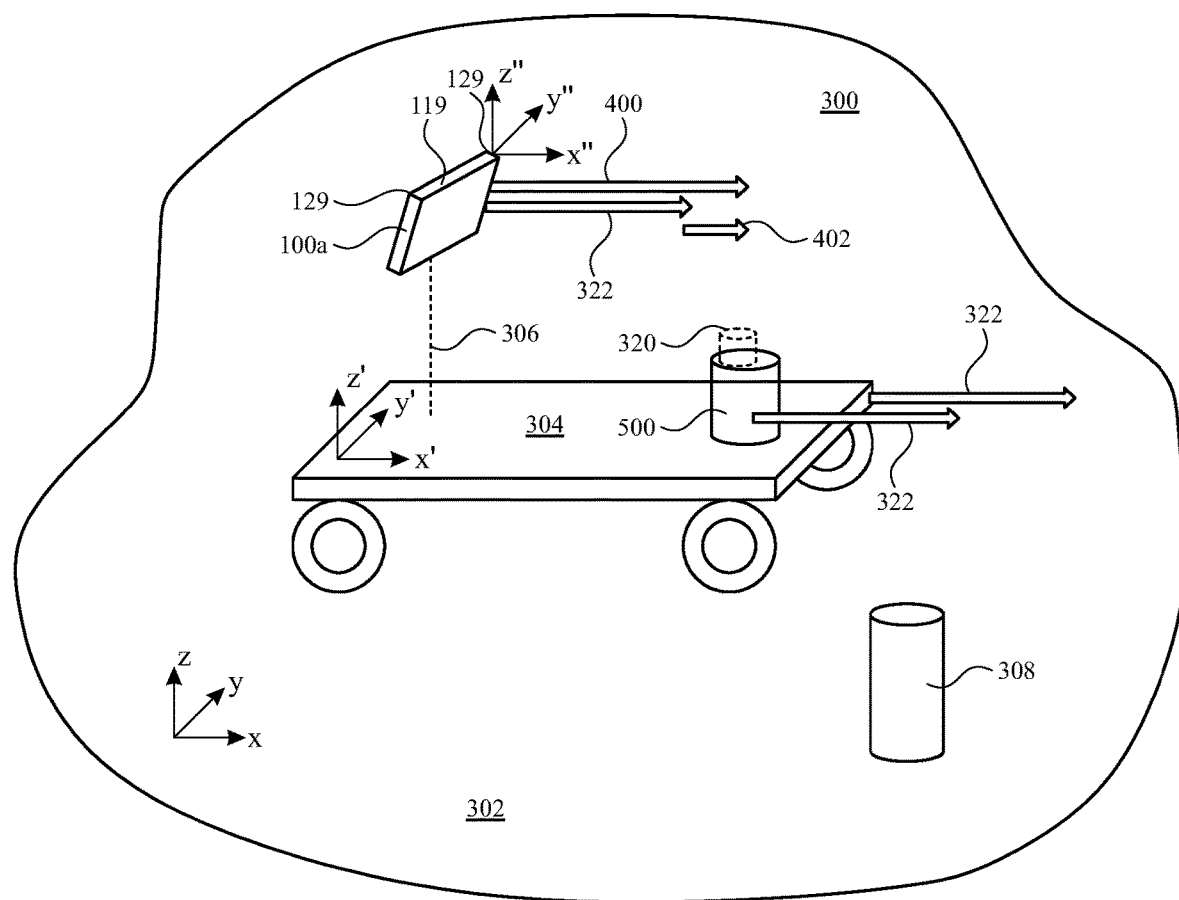
FIG. 5 illustrates an example in which virtual content is anchored to a moving platform in accordance with implementations of the subject technology.

FIGS. 3-5 illustrate examples in which virtual content is displayed by an electronic device that is at least partially coupled to a moveable platform that is currently in motion (which can be referred to as a moving platform), according to aspects of the disclosure.

In the example of FIG. 3, a physical setting 300 of an electronic device such as electronic device 100a includes a moveable platform 304. Moveable platform 304 may be implemented, as examples, as a vehicle (e.g., a car, a bus, a truck, a golf cart, or the like), a train, a watercraft (e.g., a boat, a ship, a submarine, or the like), an aircraft (e.g., an airplane, a helicopter), a skateboard, a bicycle, an elevator, an escalator, a moving sidewalk, or any other platform that can move. It is appreciated that a moveable platform, such as moveable platform 304, may be moveable using its own power (e.g., a car, a bus, a watercraft, an elevator, an escalator, or an airplane) and/or responsive to an external force such as a pulling force or a pushing force (e.g., in the cases of a train car coupled to an engine, or a vehicle or a watercraft being pushed or towed). In the example of FIG. 3, moveable platform 304 is moving with a motion 322 (e.g., a speed and a direction) relative to the physical ground 302 in the physical setting 300. The physical ground 302 may represent, for example, the surface of the Earth (or a material that is fixed to the surface of the Earth) at or near the location of the electronic device (e.g., electronic device 100a in FIG. 3). The physical ground 302 may form the basis of a fixed reference frame (e.g., the (x, y, z) reference frame) relative to which the moveable platform 304, electronic device 100a, and/or other physical objects can move. In the example of FIG. 3, the physical setting 300 also includes a physical object 308 that is stationary relative to, and may be fixed to, the physical ground 302.

In the example of FIG. 3, electronic device 100a is moving with a motion 322 that is equal to the motion 322 of the moveable platform 304. For example, an electronic device such as electronic device 100a may move together with the moveable platform 304 due to a coupling 306 between the electronic device and the moveable platform 304. For example, coupling 306 may include the electronic device 100a being coupled to the moveable platform 304 by being worn or held by a user that is sitting or standing on the moveable platform, or may include other direct or indirect couplings to the moveable platform 304 (e.g., due to the electronic device resting on a table, a chair, or other structure of the moveable platform or being mounted to or otherwise secured to a structure of the moveable platform).

As shown in FIG. 3, a virtual object 320 can be displayed by an electronic device such as electronic device 100a. In the example of FIG. 3, the virtual object 320 is rendered and displayed by electronic device 100a so as to appear to the user of electronic device 100a to be moving with the motion 322 that is equal to the motion 322 of the moveable platform (e.g., so as to appear stationary on the moveable platform). An electronic device such as electronic device 100a may, for example, determine that the electronic device is on a changing velocity platform (e.g., by detecting a discrepancy between visual and inertial data of the VI SLAM system 287), and then display the virtual object 320 at a stationary location on (or with respect to) the moveable platform 304 using the VO SLAM system 289 during the changing velocity motion. For example, electronic device 100a may obtain but ignore some or all of the inertial data from the inertial sensors of the electronic device 100a when determining where to display the virtual object 320 during changing velocity motion of the moveable platform 304. In the example of FIG. 3, virtual object 320 is displayed to appear as part of the physical setting 300. However, this is merely illustrative and it is appreciated that the virtual object 320 can be displayed to appear at a stationary location in an entirely virtual setting that is generated by electronic device 100a and moves with the moveable platform 304 (e.g., by managing the use of inertial data as described herein, when determining where to display the virtual object 320).

An electronic device such as electronic device 100a may account for the motion 322 of the electronic device that is at least partially due to the motion 322 of the moveable platform by discontinuing, reducing, and/or modifying use of some or all of the sensor data and/or sensors that are affected by the motion of the moveable platform. For example, after determining that the electronic device is moving with the moveable platform 304 using an IMU of the electronic device (e.g., by comparing visual and inertial data of the VI SLAM system 287), an electronic device such as electronic device 100a may continue to track motion of the electronic device using optical sensors and/or depth sensors of the electronic device while discontinuing use of and/or de-weighting (e.g., in a case in which a moving platform causes vibratory motion of the electronic device) some or all of the IMU data while platform-related changing velocity motion is detected.

Sensor data from sensors 129 that is indicative of platform motion may include sensor data that indicates acceleration and/or deceleration that is not detected in visual or optical data from one or more cameras. Once the motion 322 of a moving platform has been determined, the electronic device 100a can reduce and/or modify the use of the inertial data to determine where and/or how to display virtual content such as virtual object 320 in an extended reality setting.

In one or more implementations, sensors 129 of electronic device 100a include an optical sensor (e.g., an imaging sensor and/or a camera), a depth sensor, and an IMU. Device motion may initially be identified with the VI SLAM system 287. If the device motion that is determined using the VI SLAM system 287 is determined to indicate changing velocity motion due to a coupling 306 of the electronic device 100a to a moveable platform 304, virtual content such as virtual object 320 may be displayed, anchored to an anchoring location that is fixed relative to the moveable platform, using the optical sensor and/or the depth sensor, and using reduced data from the IMU (e.g., some or all of the sensor data from the IMU data may be ignored and/or some or all of the sensors of the IMU may be disabled to prevent changing velocity motion of the moveable platform from influencing the display of virtual content). In some implementations, only a portion of the IMU data that corresponds to the device motion may be ignored. For example, in some operational scenarios, only one or a subset of the sensors of the IMU may be used for continued tracking of the motion of the electronic device. For example, only a magnetometer, only one or more gyroscopes (e.g., when the motion of the moving platform is determined to be non-rotational motion), only an accelerometer (e.g., when the motion of the moving platform is determined to be constant-velocity motion), or a combination of these IMU sensors that includes less than all of the sensors of the IMU can be used in various operational scenarios. For example, in some operational scenarios, the VO SLAM system 289 may be used to control the device (e.g., to control the display of virtual content) and inertial sensor data and/or the VI SLAM system 287 may temporarily only be used to determine when the changing velocity motion of the moveable platform 304 has ended. The VI SLAM system 287 can then be used for tracking of the position and/or orientation of the electronic device 100a relative to the moveable platform 304 during a constant velocity motion of the moveable platform 304.

In the example of FIG. 3, the motion 322 of electronic device 100a is the same as, and entirely due to the motion 322 of moveable platform 304 (e.g., the electronic device 100a is fixed or stationary relative to the moveable platform, even though the system is moving relative to the physical ground 302). However, in other scenarios, electronic device 100a can be moved relative to the moving platform in addition to being moved by the moving platform.

For example, FIG. 4 illustrates a scenario in which electronic device 100a is moving with a motion 400 that includes a first component (e.g., the motion 322 due to the motion 322 of moveable platform 304) and a second component such as an additional motion 402. The additional motion 402 may be caused by, for example, a user or a wearer of electronic device 100a walking or otherwise moving around on the moveable platform 304. In the example of FIG. 4, the additional motion 402 is illustrated as linear motion in the same direction as motion 322. However, in various scenarios, the motion 400 of electronic device 100a can include various components that are separate from the motion 322 of the moveable platform, such as rotational motion of the electronic device 100a and/or other linear or non-linear translational motions of the electronic device 100a relative to the moveable platform and relative to any anchoring locations that are fixed relative to the moveable platform.

In one or more implementations, additional motion 402, such as rotational motion and/or translational motion of the electronic device 100a that is separate from the motion 322 of the moving platform, can be detected and/or tracked using VO SLAM system 289 (e.g., using visual data from the optical and/or depth sensors of sensor 129), such as while the user or wearer looks and/or moves about the moving platform) while the moveable platform 304 is in a changing velocity state, so that virtual object 320 can be displayed at a fixed location on the moving platform even as the electronic device 100a moves within the physical setting 300 with motion 322 and additional motion 402.

In one or more implementations, the electronic device such as electronic device 100a that is on the moving platform, such as moveable platform 304 while the moveable platform 304 is in motion as in the example of FIG. 4, may also track motion of the electronic device (e.g., a second component of the motion of the electronic device such as additional motion 402) that is separate from the motion of the moving platform using a SLAM system (e.g., VI SLAM system 287 and/or VO SLAM system 289). The SLAM system may include, for example one or more sensors such as sensors 129 of the electronic device. In one or more implementations, the electronic device tracks the position and/or motion of the electronic device relative to the moveable platform 304 without tracking the motion of the moveable platform (e.g., by using the VO SLAM system 289 to effectively ignore the motion of the moving platform during changing velocity portions of the motion of the moving platform).

In the examples of FIGS. 3 and 4, the virtual object 320 is displayed so as to appear stationary at a location on or within moveable platform 304.

FIG. 5 illustrates an example in which virtual object 320 is stationary relative to a physical object 500 on moveable platform 304. As shown, physical object 500 is moving with a motion 322 that is equal to and caused by the motion 322 of moveable platform 304. For example, physical object 500 may be a structural portion of the moveable platform itself or may be an object that is resting on or within and/or mechanically attached to the moveable platform. In one or more implementations, the physical object 500 may be, as examples, a seat on a train, a structural portion of a vehicle, a table on a recreational vehicle (RV), or a door of an airplane (as examples).

In one or more implementations, electronic device 100a may anchor the virtual object 320 to an anchoring location that is fixed relative to the moveable platform 304 and/or the physical object 500. This anchoring can also include anchoring the virtual content to a fixed location on the moveable platform 304 while the electronic device 100a moves on the moving platform by tracking the motion and/or orientation of the electronic device 100a using the VI SLAM system 287 during constant velocity motion of the moveable platform 304 and using the VO SLAM system 289 during changing velocity motion phases of the moveable platform 304.

In one or more implementations, tracking the motion and/or orientation of the electronic device 100a may include identifying device motion of the electronic device 100a using a visual-inertial SLAM system (e.g., VI SLAM system 287) of the device. In one or more implementations, the electronic device 100a may determine that the device motion includes a first component associated with changing velocity motion of a moving platform and a second component that is separate from the changing velocity motion of the moving platform. For example, the electronic device 100a may identify a discrepancy between visual information (e.g., a device displacement estimate determined using time-separated image frames) and inertial information (e.g., a device displacement estimate determined using one or more inertial sensors over a time period corresponding to the separation in time between the time-separated image frames) of the visual-inertial SLAM system 287. In one or more implementations, displaying virtual content anchored to an anchoring location that is fixed relative to the moveable platform 304 may include ceasing use of the visual-inertial SLAM system 287 and operating a visual-only SLAM system (e.g., VO SLAM system 289) of the device to track the orientation and/or motion of the electronic device 100a for the anchoring.

In one or more implementations, while operating the visual-only SLAM system 289, the electronic device 100a may determine, based on a comparison of gyroscope data (e.g., a gyroscope-estimated device rotation) with visual data (e.g., an image-based rotation estimate) of the visual-only SLAM system 289, that the motion of the moveable platform is at or near a constant value. The electronic device may also temporarily operate both the visual-only SLAM system 289 and the visual-inertial SLAM system 287 while comparing outputs of the visual-only SLAM system 289 and the visual-inertial SLAM system 287. The electronic device may also cease operation of the visual-only SLAM system 289 while continuing to operate the visual-inertial SLAM system 287 based on an agreement between the outputs of the visual-only SLAM system 289 and the visual-inertial SLAM system 287 (e.g., for at least a minimum period of time, such as between one and three seconds, which may correspond to a minimum number of frames such as image frames).

In one or more implementations, the electronic device 100a may operate the VI SLAM system 287 and/or the VO SLAM system 289 in various motion states of the electronic device 100a. One or more of the various motion states may be caused by motion of a movable platform (e.g., moveable platform 304) on which the electronic device 100a is disposed. For example, FIG. 6 illustrates an example use case in which an electronic device, such as electronic device 100a, is operating during the course of various phases of an airplane flight 1001.

As shown, the electronic device 100a may variously be in a constant velocity motion state 1000 (e.g., while the airplane on which the electronic device is located is motionless or travelling at a constant velocity on the ground or cruising at a constant velocity in the air), or a changing velocity motion state 1002 (e.g., a changing velocity motion state while the airplane on which the electronic device is located is accelerating while taking off, experiencing turbulence, or decelerating for landing). It is also appreciated that, during any of the constant velocity motion states 1000 and/or any of the changing velocity motion states 1002 of the airplane, the electronic device 100a may have its own motion state relative to the airplane (e.g., the electronic device may be stationary, moving at a constant translational or rotational velocity, or undergoing accelerated translational and/or rotational motion, relative to the airplane). As indicated in FIG. 6, the electronic device 100a may operate the VI SLAM system 287 (e.g., and control device operations such as display of virtual content anchored to a fixed location on the airplane based on an output of the VI SLAM system) during the constant velocity motion states 1000 of the airplane on which the electronic device is disposed, and may operate the VO SLAM system 289 (e.g., and control device operations such as display of virtual content anchored to a fixed location on the airplane based on an output of the VO SLAM system) during the changing velocity motion states 1002 of the airplane (e.g., or another movable platform in other examples), such as to track the position, orientation, and/or motion of the electronic device relative to the airplane and/or to control other device operations, during the various motion states of the airplane.

Figure 6:
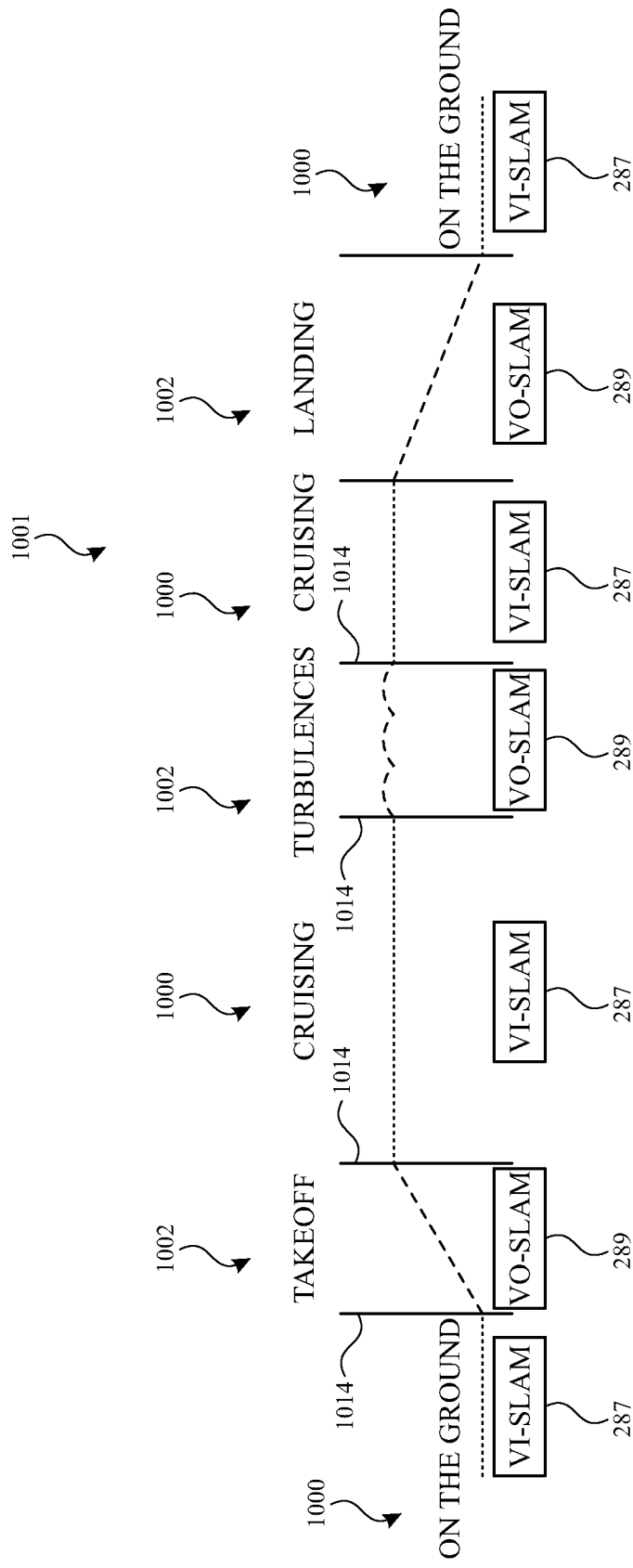
FIG. 6 illustrates an example diagram of an electronic device operating while disposed on an airplane in accordance with implementations of the subject technology.

As indicated in FIG. 6, the airplane on which the electronic device is disposed may also experience one or more transitional states 1014, in which the airplane on which the electronic device is disposed is changing from one motion state (e.g., one of constant velocity motion or changing velocity motion) to another motion state (e.g., the other of constant velocity motion or changing velocity motion). In one or more implementations, the electronic device 100a may temporarily operate both the VI SLAM system 287 and the VO SLAM system 289 during some or all of the transitional states 1014. In one or more implementations, when both the VI SLAM system 287 and the VO SLAM system 289 are operated (e.g., during a transitional state 1014 of a moving platform and/or any other state in which it is unclear to the device whether the device is on a moving platform during an changing velocity state of the moving platform or on a stationary or constant velocity platform), the device may control operations (e.g., displaying virtual content anchored to a fixed location on the airplane) using the output of the VO SLAM system 289 (e.g., only using the output of the VI SLAM system for a comparison with the output of the VO SLAM system for confirming a switch of the motion state of the platform between the constant velocity state and the changing velocity motion state or vice versa).

Figure 7:
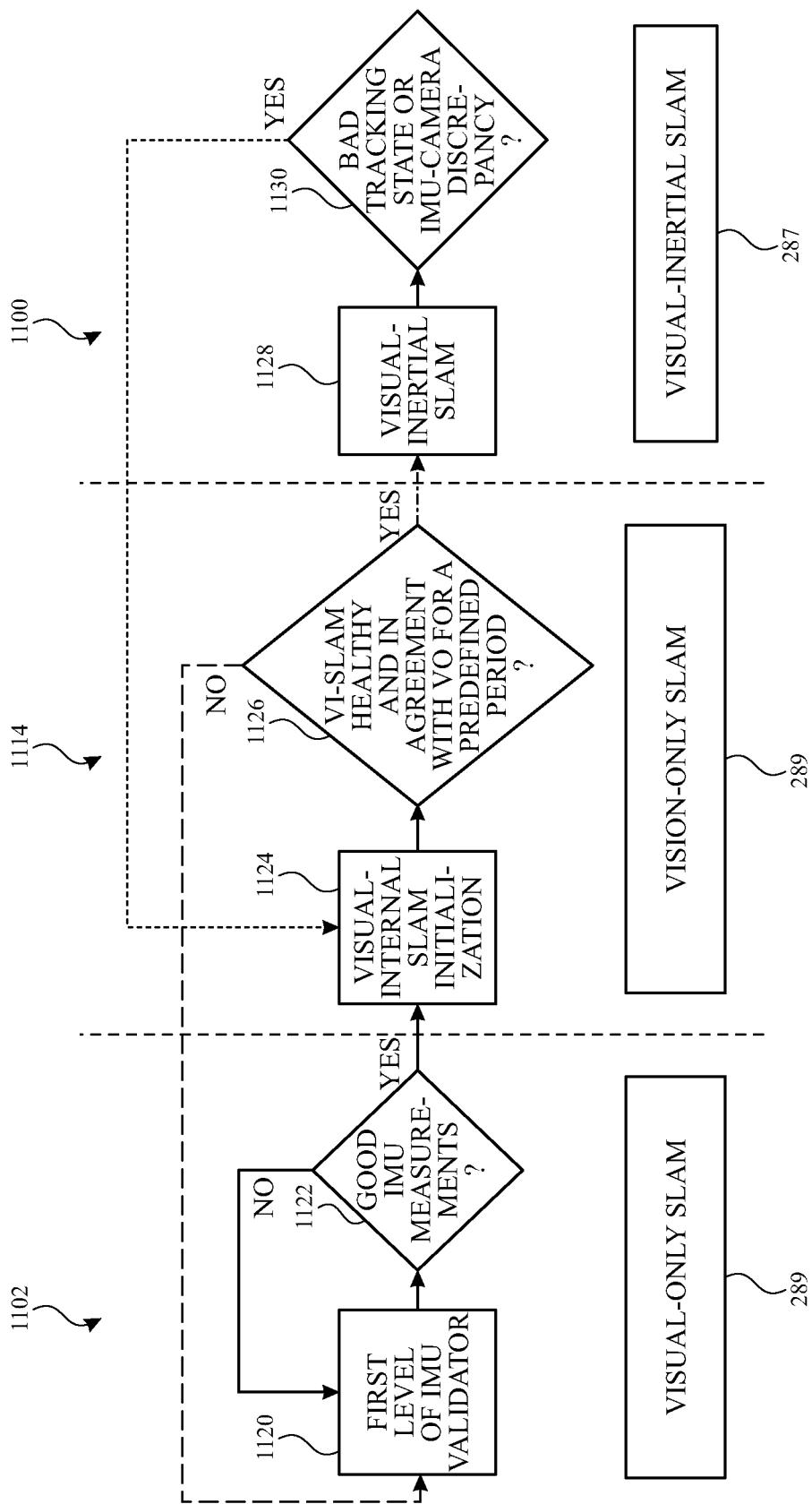
FIG. 7 illustrates aspects of various simultaneous location and mapping (SLAM) states of an electronic device in accordance with implementations of the subject technology.

FIG. 7 illustrates three SLAM states (e.g., a first SLAM state 1100, a second SLAM state 1114, and a third SLAM state 1102) of an electronic device, such as electronic device 100a, that may be variously used during the constant velocity motion state(s) 1000, the changing velocity motion state(s) 1002, and the transitional state(s) 1014 of FIG. 6. In the example of FIG. 7, the SLAM system from which output is used for controlling the device (e.g., controlling output from the device) is indicated for each state (e.g., the VI SLAM system 287 for the first SLAM state 1100 corresponding to a constant velocity motion state 1000 of the platform on which the device is disposed, and the VO SLAM system 289 for both the third SLAM state 1102 corresponding to the changing velocity motion state 1002 and the second SLAM state 1114 which may correspond to the transitional state 1014 in some operational scenarios). As shown in FIG. 7, the electronic device 100a may also perform operations (e.g., using IMU data at block 1122, block 1126, and/or block 1130) in each SLAM state for detecting a change in the motion state of a platform on which the electronic device is disposed.

In the example of FIG. 7, in the first SLAM state 1100, the electronic device may operate (block 1128) only the VI SLAM system 287 while controlling device operations (e.g., predicting a device pose and/or operating the device based on a predicted device pose) using the VI SLAM system 287 (e.g., without operating the VO SLAM system 289), and may (block 1130) determine whether the device is in a bad tracking state (e.g., a state in which an uncertainty in the output of the VI SLAM system 287 is above a threshold) and/or whether there is a discrepancy between vision-based motion data and inertial-sensor-based motion data generated by the VI SLAM system 287. For example, if the inertial data indicates a changing velocity motion of the device, but a comparison of two or more adjacent or nearly adjacent image frames indicates a different changing velocity (or no changing velocity of the device), a discrepancy may be detected. As shown, responsive to a detection of a discrepancy between the visual (image) data and the inertial data of the VI SLAM system 287, the device may switch to the second SLAM state 1114.

In the second SLAM state 1114, the device continues to operate the VI SLAM system 287 and temporarily also operates the VO SLAM system 289 (e.g., at block 1124), while controlling device operations, such as pose prediction and/or pose-prediction based operations such as displaying virtual content, using the VO SLAM system 289. As shown, in the second SLAM state 1114, the electronic device may determine (block 1126) whether a component of the device motion is due to accelerated motion of a platform on which the device is disposed. For example, the electronic device may compare the output of the VI SLAM system 287 with the output of the VO SLAM system 289. In one or more implementations, the device may switch back to the first SLAM state 1100 if the output of the VI SLAM system 287 and the output of the VO SLAM system 289 are in agreement (e.g., are the same to within a threshold difference), or may switch to the third SLAM state 1102 if the output of the VI SLAM system 287 and the output of the VO SLAM system 289 disagree (e.g., are different by more than the threshold difference).

As shown, in the third SLAM state 1102 (e.g., when the device is on a platform that is accelerating), the electronic device may operate (block 1120) only the VO SLAM system 289 and may control device operations, such as pose prediction and/or pose-prediction based operations such as displaying virtual content, using the VO SLAM system 289. In the third SLAM state 1102, the electronic device may also perform (block 1122) inertial data validation operations. For example, inertial data validation operations may include comparing a motion estimate (e.g., a translational and/or rotational motion estimate) based on visual data (e.g., image frame differences) with a motion estimate from an inertial sensor (e.g., a rotational estimate from a gyroscope and/or a linear acceleration estimate from an accelerometer). In block 1122, if the motion estimate based on visual data is in agreement with (e.g., the same as, to within a different threshold) the motion estimate from the inertial sensor, the electronic device may switch to the second SLAM state 1114 and proceed in the second SLAM state 1114 as described above. In block 1122, if the electronic device determines that the motion estimate based on visual data is different from (e.g., different by more than the difference threshold) the electronic device may remain in the third SLAM state 1102.

In the description of FIG. 7 above, the three SLAM states are referred to as a first SLAM state 1100, a second SLAM state 1114, and a third SLAM state 1102 for convenience, and it is appreciated that the first SLAM state 1100, the second SLAM state 1114, and the third SLAM state 1102 can occur in any of various orders according to the motion of the platform on which the device is disposed. In one example use case, the third SLAM state 1102 may be used when a device is first powered on or first picked up or used by a user and while IMU validation operations are occurring. In this example, the device may then switch to the second SLAM state 1114 to activate and initialize the VI SLAM system 287. In this example, the device may remain in the second SLAM state 1114 until the comparison of the VI SLAM system 287 output and the VO SLAM system 289 output are in agreement, and the device can then switch to the initialized first SLAM state 1100 until accelerated and/or discrepant motion is detected and the device switches to the second SLAM state 1114 and/or the third SLAM state 1102.

FIGS. 8-12 illustrate additional details of operations that may be performed during the SLAM states of FIG. 7. As shown in FIGS. 8-12, the electronic device 100a may also perform operations in each SLAM state, over a predetermined period of time (e.g., corresponding to a predetermined number of frames), that utilize various amounts of IMU data to help determine whether to switch to another of the SLAM states. In this way, the electronic device can avoid erroneously switching between SLAM states when the motion state of the platform has not changed and/or can avoid rapid switching (e.g., on time scales of less than a second) between SLAM states due to brief and/or temporary/transient platform motion changes. FIGS. 8-12 illustrate how the strategic management and/or use of inertial data in various SLAM states can facilitate successful device operations, even as the device is on a movable platform in various motion states, including a constant velocity motion state and a changing velocity motion state.

Figure 8:
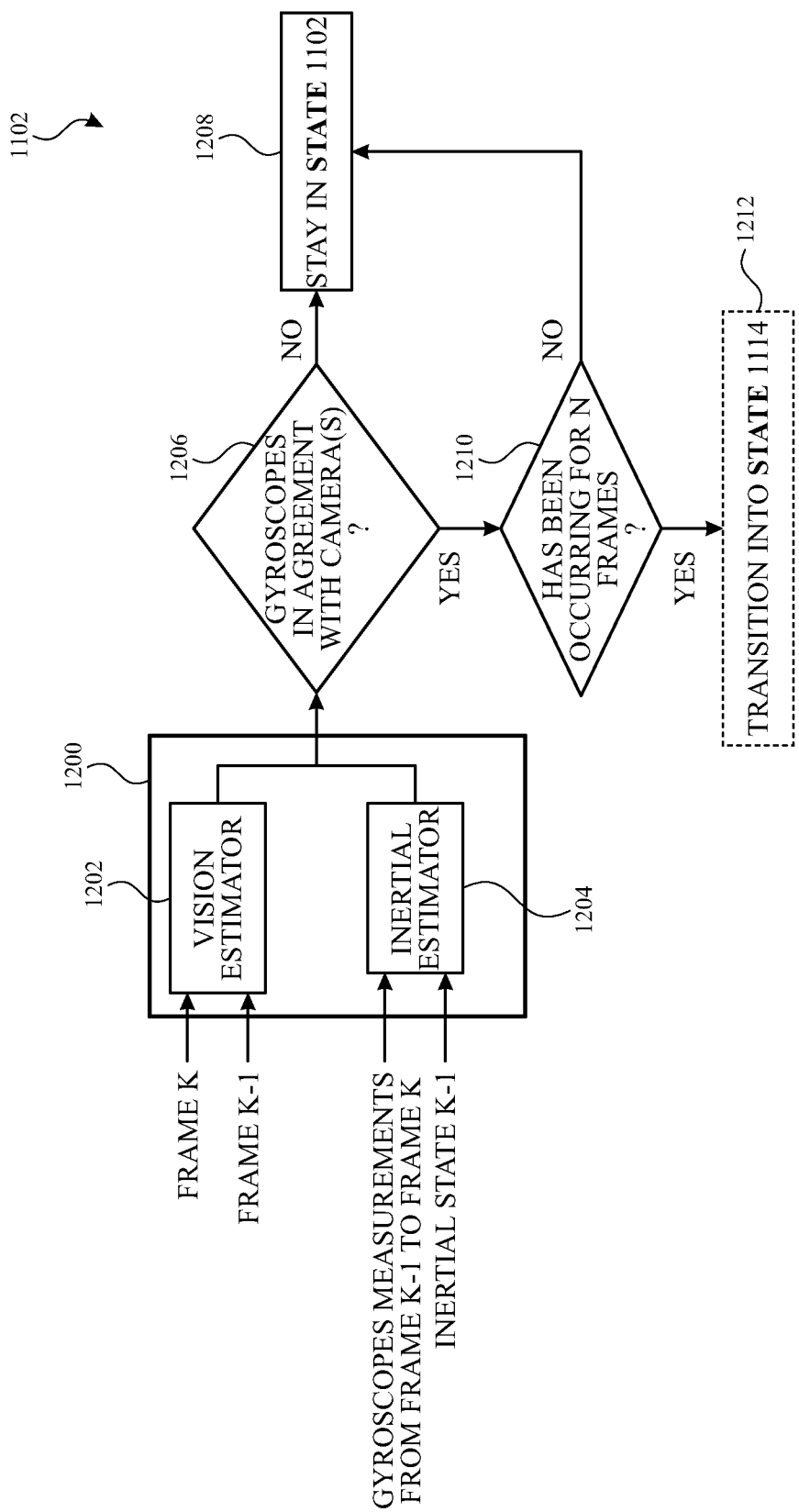
FIG. 8 illustrates additional aspects of the third SLAM state of FIG. 7 in accordance with implementations of the subject technology.

For example, FIG. 8 illustrates operations that may be performed by the electronic device 100a while the electronic device is in the third SLAM state 1102. As shown, in the third SLAM state 1102, the electronic device 100a may perform inertial validator operations 1200 (e.g., without operating the VI SLAM system 287). The inertial validator operations 1200 may include generating an image-based rotation estimate at block 1202 (e.g., by comparing and/or differencing image frames such as a $k^{th}$ frame and a $k-1^{th}$ frame from a camera(s) 119, such as using a vision propagator operation such as a perspective n-point (PnP) or a 5-pt image processing operation) and an inertial sensor (e.g., gyroscope) based rotation estimate for the electronic device at block 1204. At block 1206, the electronic device determines whether the image-based rotation estimate of block 1202 and the inertial sensor (e.g., gyroscope) based rotation estimate of block 1204 are in agreement.

As shown, if the image-based rotation estimate of block 1202 and the inertial sensor (e.g., gyroscope) based rotation estimate of block 1204 are not in agreement, the electronic device stays in the third SLAM state 1102 (block 1208). As shown, if the image-based rotation estimate of block 1202 and the inertial sensor (e.g., gyroscope) based rotation estimate of block 1204 are in agreement, the electronic device may determine (block 1210) whether the image-based rotation estimate of block 1202 and the inertial sensor (e.g., gyroscope) based rotation estimate of block 1204 have been in agreement for at least a predetermined number (e.g., a number N) of frames (e.g., corresponding to a predetermined minimum amount of time, such as at least one second, at least two seconds, or at least three seconds). As shown, if the image-based rotation estimate of block 1202 and the inertial sensor (e.g., gyroscope) based rotation estimate of block 1204 are in agreement, but have not been in agreement for at least the predetermined number of frames, the electronic device stays in the third SLAM state 1102 (block 1208). As shown, if the image-based rotation estimate of block 1202 and the inertial sensor (e.g., gyroscope) based rotation estimate of block 1204 are in agreement and have been in agreement for at least the predetermined number of frames, the electronic device transitions (block 1212) to the second SLAM state 1114 (and activates the VI SLAM system 287 as described above in connection with FIG. 7). In this way, the electronic device 100a can use a portion of the inertial data, in a limited manner while device operations are controlled using the VO SLAM system 289 (and without using the inertial data), to determine when a changing motion state of a movable platform on which the electronic device is disposed may have ended. In one or more implementations, determining (block 1210) whether the visual and inertial measurements have been in agreement for the predetermined number of frames (e.g., or a predetermined period of time) before switching to the second SLAM state 1114 may help avoid erroneously switching when the device is (e.g., still) on an accelerating platform and/or rapidly switching between SLAM states due to transient motion changes of the moveable platform.

Figure 9:
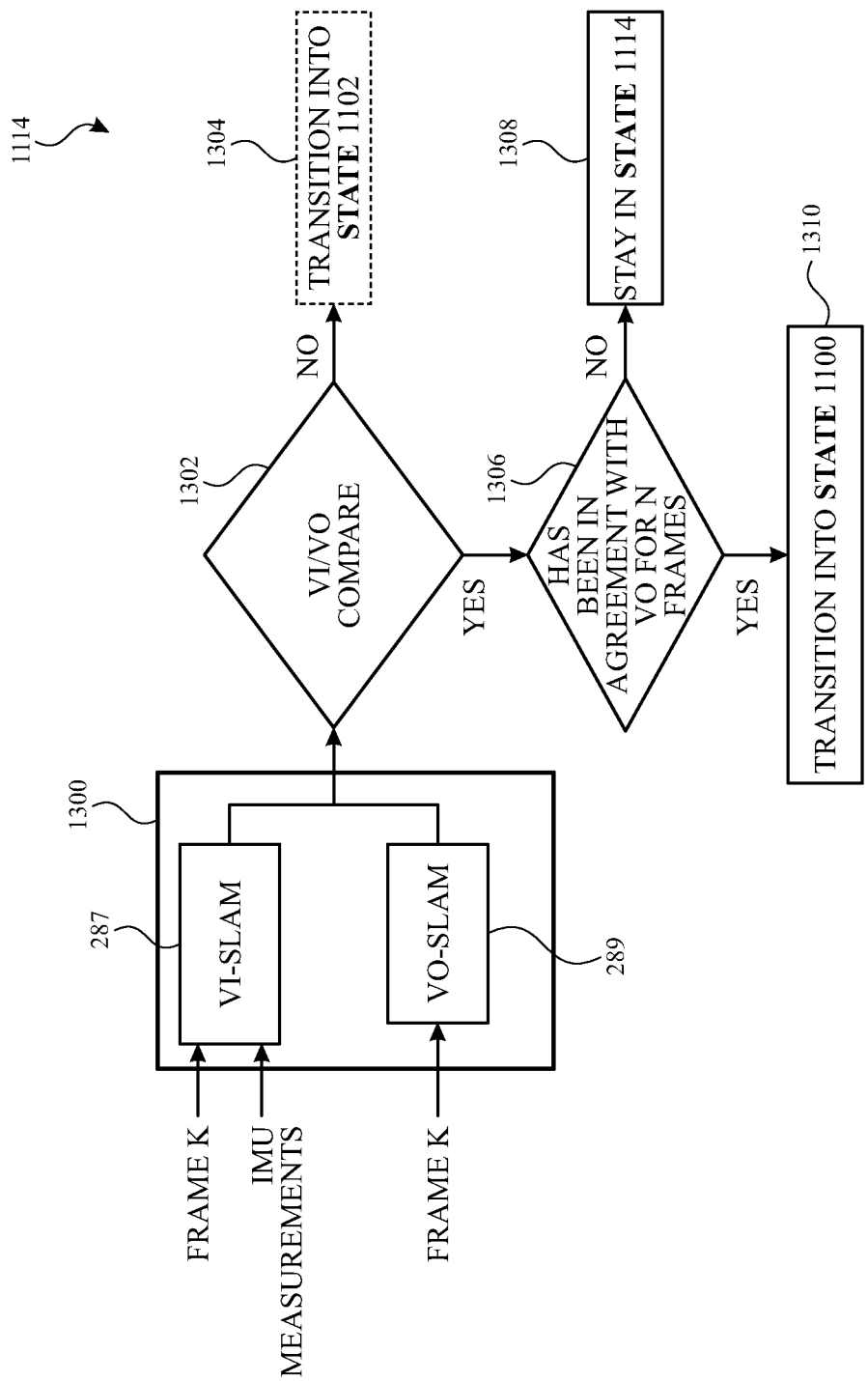
FIG. 9 illustrates additional aspects of the second SLAM state of FIG. 7 in accordance with implementations of the subject technology.

As shown in FIG. 9, in the second SLAM state 1114, the electronic device 100a may operate in a dual-SLAM mode 1300 in which the device operates both the VI SLAM system 287 and the VO SLAM system 289, and may perform a VI/VO comparison operation 1302. In the VI/VO comparison operation 1302, the electronic device determines whether the output (e.g., a device pose estimation or prediction) of the VI SLAM system 287 and the output (e.g., a device pose estimation or prediction) of the VO SLAM system 289 are in agreement. As shown, if the output of the VI SLAM system 287 and the output of the VO SLAM system 289 are not in agreement, the electronic device switches (block 1304) back to the third SLAM state 1102 and ceases operation of the VI SLAM system 287. As shown, if the output of the VI SLAM system 287 and the output of the VO SLAM system 289 are in agreement, the electronic device may determine (block 1306) whether the output of the VI SLAM system 287 and the output of the VO SLAM system 289 have been in agreement for at least a predetermined number (e.g., a number N) of frames and/or a predetermined amount of time. As shown, if the output of the VI SLAM system 287 and the output of the VO SLAM system 289 are in agreement, but have not been in agreement for at least the predetermined number of frames, the electronic device stays (block 1308) in the second SLAM state 1114. As shown, if the output of the VI SLAM system 287 and the output of the VO SLAM system 289 are in agreement and have been in agreement for at least the predetermined number of frames, the electronic device transitions (block 1310) to the first SLAM state 1100, and activates the VI SLAM system and ceases operation of the VO SLAM system. In this way, the electronic device 100a can use inertial data, in a limited manner while device operations are controlled using the VO SLAM system 289 (and without using the inertial data), to determine when a changing motion state of a movable platform on which the electronic device is disposed has ended. In one or more implementations, determining (block 1306) whether the VI and VO outputs have been in agreement for the predetermined number of frames (e.g., or a predetermined period of time) before switching to the first SLAM state may help avoid erroneously switching when the device is on an changing velocity platform and/or rapidly switching between SLAM states due to transient motion changes of the moveable platform.

Figure 10:
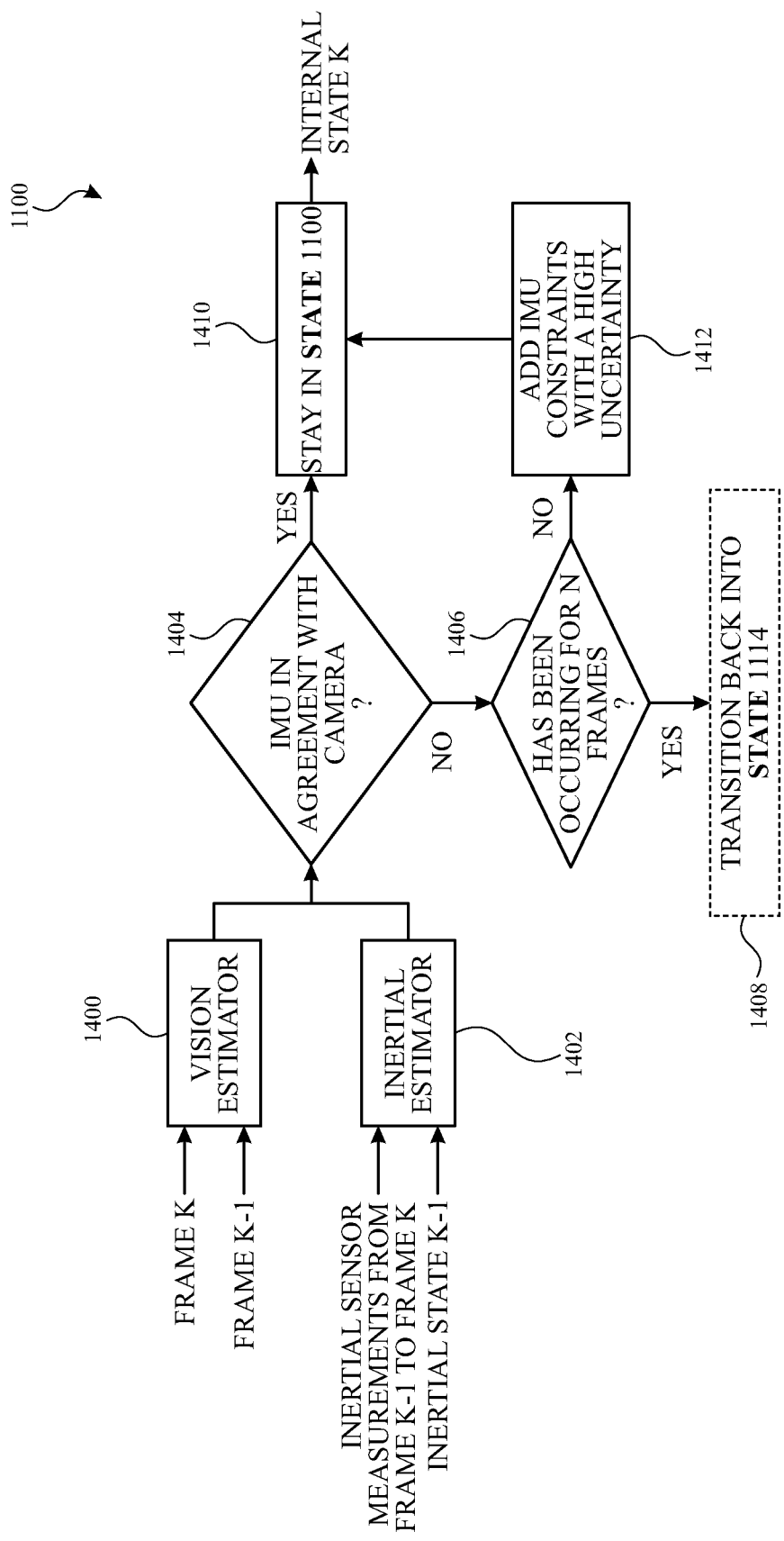
FIG. 10 illustrates additional aspects of the first SLAM state of FIG. 7 in accordance with implementations of the subject technology.

As shown in FIG. 10, in the first SLAM state 1100 (e.g., while controlling device operations using the VI SLAM system 287 with full use of the inertial data), the electronic device 100a may (e.g., without operating the VO SLAM system 289) generate a vision-based motion estimate 1400 (e.g., by comparing and/or differencing image frames such as a kth frame and a k-1th frame from a camera(s) 119) and an inertial sensor (e.g., IMU) based rotation estimate 1402 for the electronic device. At block 1404, the electronic device determines whether the vision-based motion estimate 1400 and the inertial sensor (e.g., gyroscope) based motion estimate 1402 are in agreement. As shown, if the vision-based motion estimate 1400 and the inertial sensor based motion estimate 1402 are in agreement, the electronic device stays (block 1410) in the first SLAM state 1100. As shown, if the vision-based motion estimate 1400 and the inertial sensor based motion estimate 1402 are not in agreement, the electronic device may determine (block 1406) whether the vision-based motion estimate 1400 and the inertial sensor based motion estimate 1402 have been in disagreement for at least a predetermined number (e.g., a number N) of frames.

As shown, if the vision-based motion estimate 1400 and the inertial sensor based motion estimate 1402 are not in agreement, but have been in agreement within at least the predetermined number of frames, the electronic device continues (block 1412) to operate (and control the device based on) the VI SLAM system 287, in part by de-weighting inertial sensor measurements (e.g., by assigning a high uncertainty to the inertial sensor measurements within the VI SLAM system 287 computations). As shown, if the vision-based motion estimate 1400 and the inertial sensor based motion estimate 1402 are in disagreement and have been in disagreement for at least the predetermined number of frames, the electronic device transitions (block 1408) to the second SLAM state 1114 and activates the VO SLAM system 289. In one or more implementations, determining (block 1406) whether the visual and inertial motion measurements have been in disagreement for the predetermined number of frames (e.g., and/or a predetermined period of time) before switching to the second SLAM state 1114 may help avoid erroneously switching to the VO SLAM system 289 when the device is on a constant motion platform and/or rapidly switching between SLAM states due to transient motion changes of the moveable platform. In one or more implementations, de-weighting the inertial measurement parameters at block 1412 while continuing to operate the device using the VI SLAM system 287 and before switching to the second SLAM state 1114 may strategically reduce the usage of the inertial data to help reduce errors in device control (e.g., pose estimation and/or pose-based control) due to accelerated motion while the device is verifying that accelerated motion exists.

Figure 11:
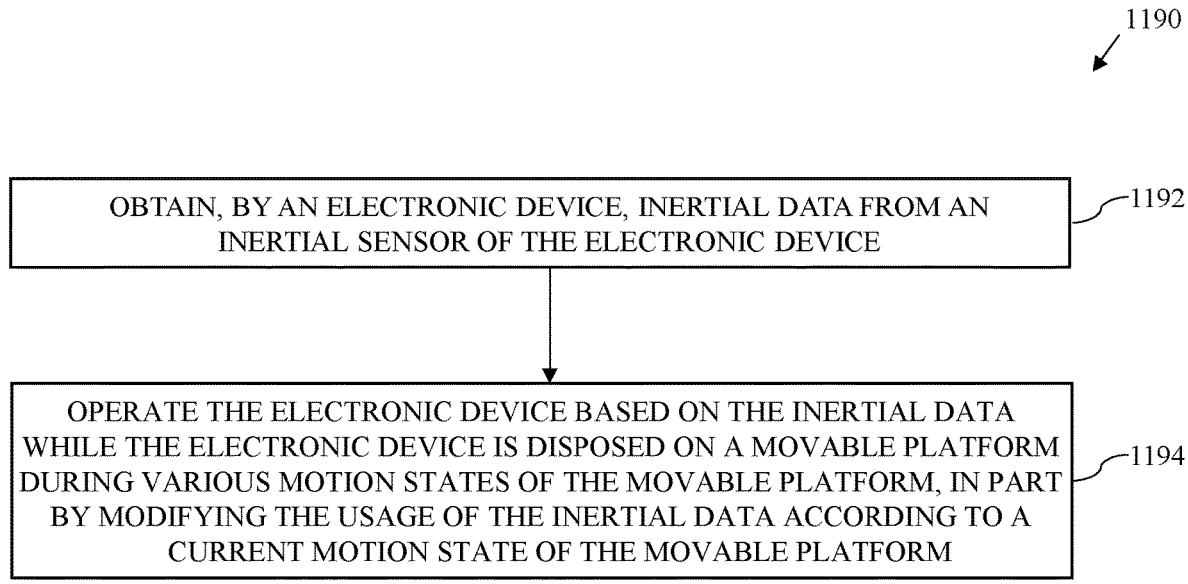
FIG. 11 illustrates a flow chart of example operations that may be performed for operating an electronic device in accordance with implementations of the subject technology.

FIG. 11 illustrates a flow diagram of an example process 1190 for operating an electronic device in accordance with implementations of the subject technology. For explanatory purposes, the process 1190 is primarily described herein with reference to the electronic device 100*a* of FIGS. 1A, 1B, and 2. However, the process 1190 is not limited to the electronic device 100*a* of FIGS. 1A, 1B, and 2, and one or more blocks (or operations) of the process 1190 may be performed by one or more other components of other suitable devices, including the electronic device 100*b* and/or the electronic device 100*c*. Further for explanatory purposes, some of the blocks of the process 1190 are described herein as occurring in serial, or linearly. However, multiple blocks of the process 1190 may occur in parallel. In addition, the blocks of the process 1190 need not be performed in the order shown and/or one or more blocks of the process 1190 need not be performed and/or can be replaced by other operations.

As illustrated in FIG. 11, at block 1192, an electronic device such as electronic device 100*a* may obtain inertial data from an inertial sensor of the electronic device.

At block 1194, the electronic device may be operated based on the inertial data while the electronic device is disposed on a moveable platform (e.g., moveable platform 304) during various motion states (e.g., a stationary state, a constant velocity motion state, a changing velocity motion state, and/or a transitional state) of the moveable platform, in part by modifying the usage of the inertial data according to a current motion phase of the moveable platform. For example, illustrative operations that may be performed for operating an electronic device based on the inertial data while the electronic device is disposed on the moveable platform during various motion states of the moveable platform, in part by modifying the usage of the inertial data according to the current motion state of the moveable platform, are described hereinafter in connection with FIG. 12.

Figure 12:
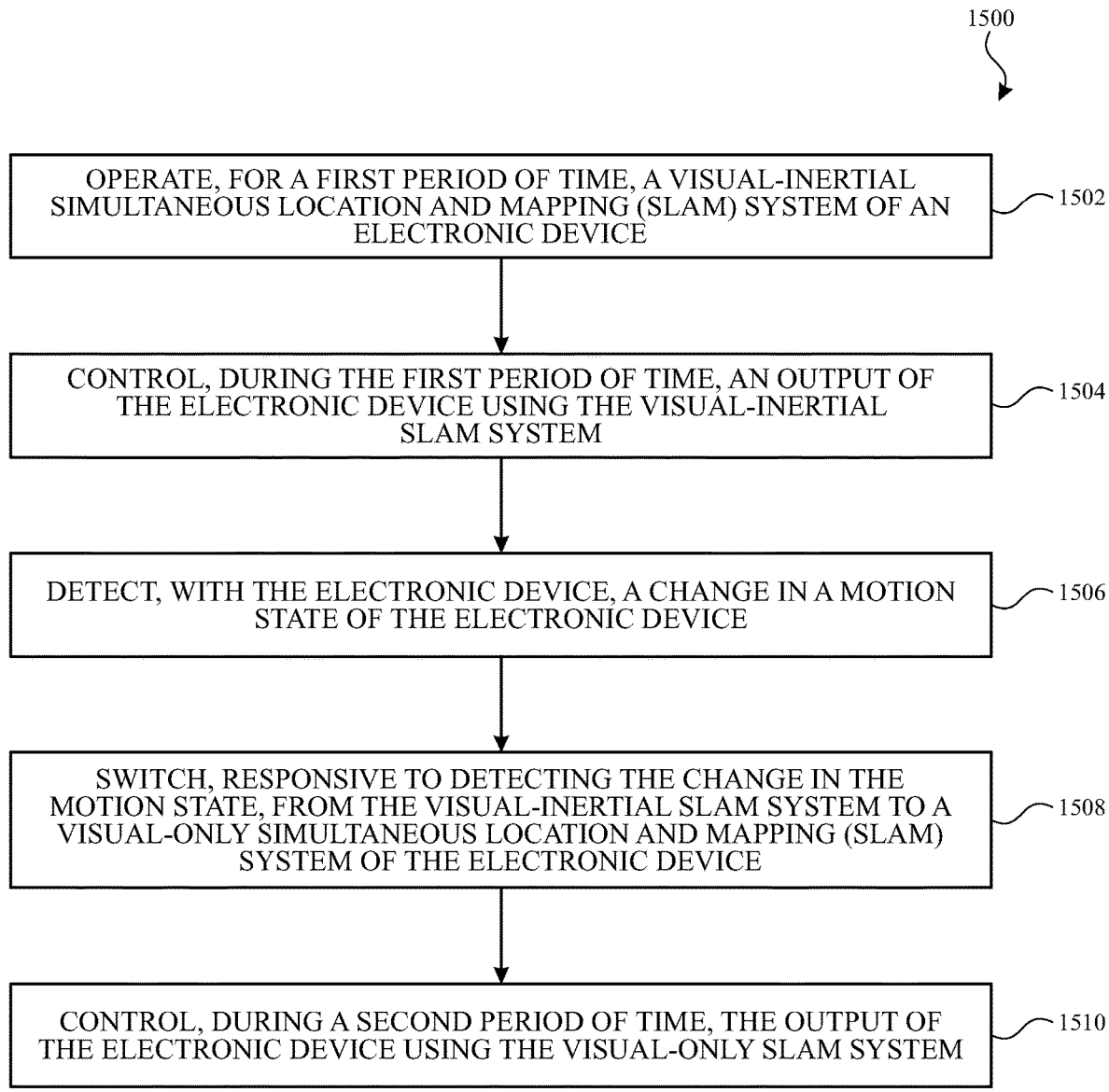
FIG. 12 illustrates a flow chart of additional operations that may be performed for operating an electronic device in accordance with implementations of the subject technology.

FIG. 12 illustrates a flow diagram of an example process 1500 for operating an electronic device in accordance with implementations of the subject technology. For explanatory purposes, the process 1500 is primarily described herein with reference to the electronic device 100*a* of FIGS. 1A, 1B, and 2. However, the process 1500 is not limited to the electronic device 100*a* of FIGS. 1A, 1B, and 2, and one or more blocks (or operations) of the process 1500 may be performed by one or more other components of other suitable devices, including the electronic device 100*b* and/or the electronic device 100*c*. Further for explanatory purposes, some of the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

As illustrated in FIG. 12, at block 1502, an electronic device such as electronic device 100*a* may operate, for a first period of time, a first simultaneous location and mapping (SLAM) system (e.g., a visual-inertial SLAM system such as VI SLAM system 287) of the electronic device. The electronic device may be disposed on a movable platform, such as a car, a train, an airplane, an elevator, an escalator, a moving sidewalk, or other movable or moving platform as described herein.

At block 1504, the electronic device may control, during the first period of time, an output (e.g., display of virtual content) of the electronic device using the first (e.g., visual-inertial) SLAM system. For example, controlling the output of the electronic device may include displaying virtual content anchored to a moving platform on which the electronic device is disposed.

At block 1506, the electronic device may detect a change in a motion state of the electronic device. For example, the change in the motion state of the electronic device may be cause by a change in a motion state of a platform on which the electronic device is disposed (e.g., a change from a constant motion state, which can include a constant zero motion state to an accelerated motion state when the platform begins to move or changes speed and/or direction).

For example, detecting the change in the motion state may include detecting a discrepancy between visual data and inertial data of the visual-inertial SLAM system, as described in connection with the first SLAM state 1100 of FIGS. 7 and 10. In one or more implementations, the visual data may include an image-based rotation estimate for the electronic device, and the inertial data may include a gyroscope-based rotation estimate for the electronic device. The visual data and the inertial data may also, or alternatively, include other respective image-based and inertial-based motion estimates such as linear motion estimates and/or acceleration estimates.

At block 1506, the electronic device may switch, responsive to detecting the change in the motion state, from the first (e.g., visual-inertial) SLAM system to a second simultaneous location and mapping (SLAM) system (e.g., a visual-only SLAM system such as VO SLAM system 289) of the electronic device. Switching from the first (e.g., visual-inertial) SLAM system to the second (e.g., visual-only) SLAM system may include switching from a first SLAM state, such as first SLAM state 1100 described herein, to another SLAM state, such as third SLAM state 1102 described herein (e.g., directly and/or via an additional SLAM state, such as second SLAM state 1114 described herein).

At block 1508, the electronic device may control, during a second period of time, the output of the electronic device using the second (e.g., visual-only) SLAM system. In one or more implementations, responsive to detecting the discrepancy and prior to the switching, the electronic device may also temporarily operate both the visual inertial SLAM system and the visual-only SLAM system while comparing outputs of the visual-only SLAM system and the visual-inertial SLAM system (e.g., as described above in connection with the second SLAM state 1114 of FIGS. 7 and 9). For example, while temporarily operating both the visual inertial SLAM system and the visual-only SLAM system, the electronic device may control, during a third period of time, the output of the electronic device using the visual-only SLAM system.

In one or more implementations, prior to temporarily operating both the visual-only SLAM system and the visual-inertial SLAM system and after the detecting, the electronic device may also temporarily continuing to operate the visual-inertial SLAM system while de-weighting the visual data of the visual-inertial SLAM system (e.g., as described above in connection with block 1412 of FIG. 10). The electronic device may also determine, while temporarily continuing to operate the visual-inertial SLAM system while de-weighting the visual data of the visual-inertial SLAM system, whether the discrepancy has been occurring for a predetermined minimum amount of time (e.g., as described above in connection with block 1412 of FIG. 10).

Various processes defined herein consider the option of obtaining and utilizing a user's personal information. For example, such personal information may be utilized in order to provide extended reality for moving platforms. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the subject disclosure, a method is provided that includes identifying device motion of a device using one or more sensors of the device; determining that the device motion includes a first component associated with a motion of a moving platform and a second component that is separate from the motion of the moving platform; determining an anchoring location that is fixed relative to the moving platform; and displaying, with a display of the device, virtual content anchored to the anchoring location that is fixed relative to the moving platform, using at least the second component of the device motion that is separate from the motion of the moving platform.

In accordance with aspects of the subject disclosure, a device is provided that includes a display; one or more sensors; and one or more processors configured to: identify device motion of the device using the one or more sensors; determine that the device motion includes a first component associated with a motion of a moving platform and a second component that is separate from the motion of the moving platform; determine an anchoring location that is fixed relative to the moving platform; and display virtual content anchored to the anchoring location that is fixed relative to the moving platform, using at least the second component of the device motion that is separate from the motion of the moving platform.

In accordance with aspects of the subject disclosure, a non-transitory computer-readable medium is provided that includes instructions, which when executed by a computing device, cause the computing device identify device motion of a device using one or more sensors of the device; determine that the device motion includes a first component associated with a motion of a moving platform and a second component that is separate from the motion of the moving platform; determine an anchoring location that is fixed relative to the moving platform; and display virtual content anchored to the anchoring location that is fixed relative to the moving platform, using at least the second component of the device motion that is separate from the motion of the moving platform.

In accordance with aspects of the subject disclosure, a method is provided that includes operating, for a first period of time, a first simultaneous location and mapping (SLAM) system of an electronic device; controlling, during the first period of time, an output of the electronic device using the first SLAM system; detecting, with the electronic device, a change in a motion state of the electronic device; switching, responsive to detecting the change in the motion state, from the first SLAM system to a second simultaneous location and mapping (SLAM) system of the electronic device; and controlling, during a second period of time, the output of the electronic device using the second SLAM system.

In accordance with aspects of the subject disclosure, a method is provided that includes obtaining, by an electronic device, inertial data from an inertial sensor of the electronic device; and operating the electronic device based on the inertial data while the electronic device is disposed on a moveable platform during various motion phases of the moveable platform, in part by modifying the usage of the inertial data according to a current motion phase of the moveable platform.

In accordance with aspects of the subject disclosure, an electronic device is provided that includes a display; an inertial sensor; and one or more processors configured to: obtain inertial data from the inertial sensor; and operate the electronic device based on the inertial data while the electronic device is disposed on a moveable platform during various motion phases of the moveable platform, in part by modifying the usage of the inertial data according to a current motion phase of the moveable platform.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term web site, as used herein, may include any aspect of a web site, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
obtaining, by an electronic device, inertial data from an inertial sensor of the electronic device; and
operating the electronic device based on the inertial data while the electronic device is disposed on a moveable platform during various motion states of the moveable platform, in part by modifying the usage of the inertial data according to a current motion state of the moveable platform, wherein the operating comprises:
controlling, during a first period of time, the electronic device using a visual-inertial simultaneous location and mapping (SLAM) system;
detecting, with the electronic device, a change in a motion state of the movable platform; and
switching to controlling, during a second period of time and responsive to detecting the change in the motion state of the moveable platform, the electronic device using a visual-only SLAM system.

2. The method of claim 1, wherein detecting the change in the motion state comprises detecting a discrepancy between visual data of the visual-inertial SLAM system and the inertial data of the visual-inertial SLAM system.

3. The method of claim 2, wherein the visual data comprises an image-based rotation estimate for the electronic device, and the inertial data comprises a gyroscope-based rotation estimate for the electronic device.

4. The method of claim 2 wherein the operating further comprises, responsive to detecting the discrepancy and prior to the switching, temporarily operating both the visual-inertial SLAM system and the visual-only SLAM system while comparing outputs of the visual-only SLAM system and the visual-inertial SLAM system.

5. The method of claim 4, wherein the operating further comprises, while temporarily operating both the visual-inertial SLAM system and the visual-only SLAM system, controlling, during a third period of time, the output of the electronic device using the visual-only SLAM system.

6. The method of claim 4, wherein the operating further comprises, prior to temporarily operating both the visual-only SLAM system and the visual-inertial SLAM system and after the detecting:
temporarily continuing to operate the visual-inertial SLAM system while de-weighting the visual data of the visual-inertial SLAM system; and
determining, while temporarily continuing to operate the visual-inertial SLAM system while de-weighting the visual data of the visual-inertial SLAM system, whether the discrepancy has been occurring for a predetermined minimum amount of time.

7. The method of claim 1, wherein the operating comprises displaying virtual content anchored to the moveable platform on which the electronic device is disposed.

8. The method of claim 1, wherein operating the electronic device based on the inertial data while the electronic device is disposed on the moveable platform during various motion states of the moveable platform comprises operating the electronic device based on the inertial data while the electronic device is worn or carried by a user that is disposed on the moveable platform during various motion states of the moveable platform.

9. An electronic device, comprising:
a display;
an inertial sensor; and
one or more processors configured to:
obtain inertial data from the inertial sensor; and
operate the electronic device based on the inertial data while the electronic device is disposed on a moveable platform during various motion states of the moveable platform, in part by modifying the usage of the inertial data according to a current motion state of the moveable platform by:
controlling, during a first period of time, the electronic device using a visual-inertial simultaneous location and mapping (SLAM) system;
detecting a change in a motion state of the movable platform; and
switching to controlling, during a second period of time and responsive to detecting the change in the motion state of the moveable platform, the electronic device using a visual-only SLAM system.

10. The electronic device of claim 9, wherein the one or more processors are configured to detect the change in the motion state at least in part by detecting a discrepancy between visual data of the visual-inertial SLAM system and the inertial data of the visual-inertial SLAM system.

11. The electronic device of claim 10, wherein the visual data comprises an image-based rotation estimate for the electronic device, and the inertial data comprises a gyroscope-based rotation estimate for the electronic device.

12. The electronic device of claim 10 wherein the one or more processors are configured to modify the usage of the inertial data according to the current motion state of the moveable platform by, responsive to detecting the discrepancy and prior to the switching, temporarily operating both the visual-inertial SLAM system and the visual-only SLAM system while comparing outputs of the visual-only SLAM system and the visual-inertial SLAM system.

13. The electronic device of claim 12, wherein the one or more processors are further configured to modify the usage of the inertial data according to the current motion state of the moveable platform by, while temporarily operating both the visual-inertial SLAM system and the visual-only SLAM system, controlling, during a third period of time, the output of the electronic device using the visual-only SLAM system.

14. The electronic device of claim 12, wherein the one or more processors are further configured to modify the usage of the inertial data according to the current motion state of the moveable platform by, prior to temporarily operating both the visual-only SLAM system and the visual-inertial SLAM system and after the detecting:
temporarily continuing to operate the visual-inertial SLAM system while de-weighting the visual data of the visual-inertial SLAM system; and
determining, while temporarily continuing to operate the visual-inertial SLAM system while de-weighting the visual data of the visual-inertial SLAM system, whether the discrepancy has been occurring for a predetermined minimum amount of time.

15. The electronic device of claim 9, wherein the one or more processors are configured to operate the electronic device based on the inertial data at least in part by displaying virtual content anchored to the moveable platform on which the electronic device is disposed.

16. A non-transitory computer-readable medium comprising instructions, which when executed by one or more processors, cause the one or more processors to:
   operate, for a first period of time, a visual-inertial simultaneous location and mapping (SLAM) system of an electronic device;
   control, during the first period of time, an output of the electronic device using the visual-inertial SLAM system;
   detect, with the electronic device, a change in a motion state of the electronic device;
   switch, responsive to detecting the change in the motion state, from the visual-inertial SLAM system to a visual-only simultaneous location and mapping (SLAM) system of the electronic device; and
   control, during a second period of time, the output of the electronic device using the visual-only SLAM system.

17. The non-transitory computer-readable medium of claim 16, wherein the instructions, when executed by the one or more processors, further cause the one or more processors to detect the change in the motion state at least in part by detecting a discrepancy between visual data of the visual-inertial SLAM system and inertial data of the visual-inertial SLAM system.

* * * * *